US010296736B2

(12) United States Patent
Ahmad et al.

(10) Patent No.: US 10,296,736 B2
(45) Date of Patent: *May 21, 2019

(54) ORAL AUTHENTICATION MANAGEMENT

(71) Applicant: International Business Machines Corporation, Armonk, NY (US)

(72) Inventors: Faraz Ahmad, Bareilly (IN); Anto Ajay Raj John, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,432

(22) Filed: Aug. 27, 2018

(65) Prior Publication Data
US 2018/0365408 A1    Dec. 20, 2018

Related U.S. Application Data

(63) Continuation of application No. 15/798,808, filed on Oct. 31, 2017, which is a continuation of application No. 14/873,289, filed on Oct. 2, 2015, now Pat. No. 9,875,352.

(51) Int. Cl.
| | | |
|---|---|---|
| *G06F 21/44* | (2013.01) | |
| *G06F 21/45* | (2013.01) | |
| *G06F 3/01* | (2006.01) | |
| *G06F 21/31* | (2013.01) | |

(52) U.S. Cl.
CPC .............. *G06F 21/44* (2013.01); *G06F 3/011* (2013.01); *G06F 21/31* (2013.01); *G06F 21/45* (2013.01)

(58) Field of Classification Search
CPC .......... G06F 21/44; G06F 3/011; G06F 21/31; G06F 21/45; G06F 3/017
See application file for complete search history.

(56) References Cited

U.S. PATENT DOCUMENTS

| | | | |
|---|---|---|---|
| 4,629,424 A | 12/1986 | Lauks et al. | |
| 5,212,476 A | 5/1993 | Maloney | |
| 5,460,186 A | 10/1995 | Buchhold | |
| 5,523,745 A | 6/1996 | Fortune et al. | |
| 5,689,246 A | 11/1997 | Dordick et al. | |
| 6,219,639 B1 * | 4/2001 | Bakis ................. | G06K 9/00885 382/116 |
| 6,421,453 B1 * | 7/2002 | Kanevsky ............. | G06F 21/316 340/5.2 |
| 6,598,006 B1 | 7/2003 | Honda et al. | |

(Continued)

FOREIGN PATENT DOCUMENTS

KR    1020070046998 A    4/2007

OTHER PUBLICATIONS

Chuang, J., et al., "I Think, Therefore I Am: Usability and Security of Authentication Using Brainwaves", Research Paper, UC Berkeley. 16 pages.

(Continued)

*Primary Examiner* — Kambiz Zand
*Assistant Examiner* — Tongoc Tran
(74) *Attorney, Agent, or Firm* — Stosch Sabo

(57) ABSTRACT

A user manages security of one or more user devices by manipulating one or more sensors located in the user's mouth in a predetermined pattern corresponding to a password. The matching of the predetermined pattern to the password unlocks at least a portion of at least one user device.

20 Claims, 4 Drawing Sheets

(56) References Cited

U.S. PATENT DOCUMENTS

| | | | |
|---|---|---|---|
| 6,720,860 B1 | 4/2004 | Narayanaswami | |
| 7,071,844 B1 | 7/2006 | Moise | |
| 7,962,342 B1* | 6/2011 | Coughlan | G10L 15/22 |
| | | | 379/201.01 |
| 8,242,880 B2 | 8/2012 | Ghovanloo et al. | |
| 8,548,394 B2 | 10/2013 | Christensen | |
| 9,159,321 B2* | 10/2015 | Cheung | G10L 15/25 |
| 9,875,352 B2 | 1/2018 | Ahmad et al. | |
| 2002/0126879 A1* | 9/2002 | Mihara | G06K 9/00201 |
| | | | 382/118 |
| 2005/0091539 A1 | 4/2005 | Wang et al. | |
| 2007/0023519 A1 | 2/2007 | Chung | |
| 2007/0270221 A1 | 11/2007 | Park et al. | |
| 2009/0051564 A1 | 2/2009 | Najanguaq Sovso Andreasen Strujik | |
| 2010/0007512 A1 | 1/2010 | Ghovanloo et al. | |
| 2011/0040946 A1 | 2/2011 | Courtney | |
| 2011/0235870 A1* | 9/2011 | Ichikawa | G06F 21/32 |
| | | | 382/118 |
| 2012/0259554 A1 | 10/2012 | Chen et al. | |
| 2012/0299826 A1 | 11/2012 | Moeller | |
| 2012/0329406 A1 | 12/2012 | Christensen | |
| 2014/0089672 A1 | 3/2014 | Luna et al. | |
| 2014/0129233 A1 | 5/2014 | Chung et al. | |
| 2015/0305671 A1 | 10/2015 | Yoon et al. | |
| 2016/0189536 A1 | 6/2016 | Kimmel | |
| 2017/0098069 A1 | 4/2017 | Ahmad et al. | |
| 2018/0052989 A1 | 2/2018 | Ahmad et al. | |

OTHER PUBLICATIONS

Unknown, "Ehanced out-of-band authentication using wearable devices", Movilok Interactividad Movil S.L. Madrid, Spain. 4 pages.

Salem et al., "An Isometric Tongue Pointing Device", CHI 97 Electronic Publication, Copyright ACM 1997, Technical Notes, 4 pages, printed May 6, 2015.

Girardi, "Tongue-Touch controls give Ben a more satisfying, self-sufficient lifestyle", TeamRehab Report, Feb. 16, 1997, 3 pages.

Peng et al., "ZigBee-based Wireless Intra-oral Control System for Quadriplegic Patients", Proceedings of the 29th Annual International Conference of the IEEE EMBS, Aug. 2007, 4 pages.

Huo et al., "Introduction and preliminary evaluation of the Tongue Drive System: Wireless tongue-operating assistive technology for people with little or no upper-limb function", Journal of Rehabilitation Research and Development, JRRD, vol. 45, No. 6, 2008, 10 pages.

IBM, List of IBM Patents or Patent Applications Treated as Related, Aug. 27, 2018, 2 pages.

* cited by examiner

ORAL AUTHENTICATION MANAGEMENT

BACKGROUND

The present disclosure relates generally to user devices, and more particularly, to authentication management for mobile and wearable devices.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
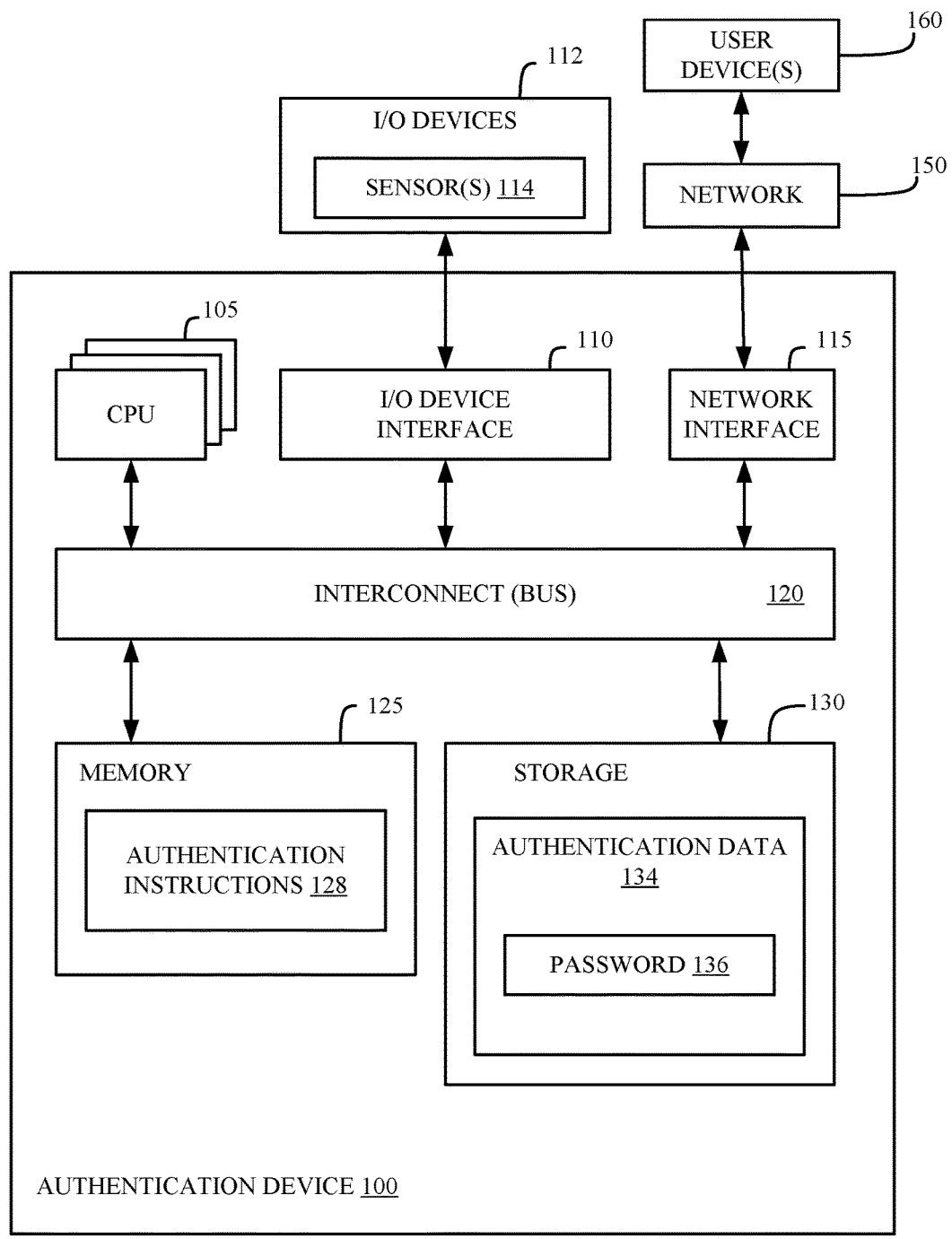
FIG. 1 illustrates a block diagram of an authentication device according to some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

SUMMARY

Aspects of the present disclosure include a method comprising monitoring one or more sensors located in an oral cavity of a user and configured to measure one or more properties controllable by the user. The method can further comprise identifying a sequence of stimuli based on monitoring the one or more sensors and comparing the sequence of stimuli to a password that is associated with a user device. The method can further comprise unlocking at least a portion of the user device in response to determining that the sequence of stimuli matches the password by comparing the sequence of stimuli to the password.

Further aspects of the present disclosure include a system comprising one or more sensors each configured to sense a respective user-controlled stimulus and located in an oral cavity of a user. The system can further comprise a memory configured to store a first sequence of stimuli corresponding to a password. The system can further comprise a processing unit communicatively coupled to the one or more sensors and configured to monitor the one or more sensors to detect a second sequence of stimuli and to compare the second sequence of stimuli to the first sequence of stimuli. The processing unit can be further configured to unlock at least a portion of a user device in response to matching the second sequence of stimuli to the first sequence of stimuli based on the comparison of the first sequence of stimuli to the second sequence of stimuli.

Further aspects of the present disclosure comprise a computer program product for authenticating a user device. The computer program product can comprise a computer readable storage medium having program instructions embodied therewith. The program instructions stored on the computer readable storage medium can be executed by a processor to cause the processor to perform a method which can comprise monitoring data received from one or more sensors each located in a mouth of a user and configured to sense respective stimuli controllable by the user. The processor can perform a method further comprising determining a sequence of stimuli based on the monitored data received from the one or more sensors, and comparing the sequence of stimuli to a password that is associated with a user device. The processor can perform a method further comprising unlocking at least a portion of the user device in response to determining that the sequence of stimuli matches the password.

DETAILED DESCRIPTION

Aspects of the present disclosure relate generally to security management of mobile and wearable devices. In various embodiments, more particular aspects relate to authenticating and/or unlocking mobile and/or wearable devices. While the present disclosure is not necessarily limited to such applications, some aspects of the disclosure can be appreciated through a discussion of various examples using this context.

For the purposes of the present disclosure, singular references made to either a wearable device or a mobile device should not be construed as limiting to said device. For example, reference to a wearable device should be construed as exemplary and should not be construed to exclude, for example, mobile devices. Thus, for the purposes of the present disclosure, unless explicitly stated otherwise, the methods, computer program products, and/or devices associated with aspects of the present disclosure should be understood to be operable with, and/or integrated into, a wearable device, a mobile device, or other user device, application, or product according to the various embodiments of the present disclosure.

Wearable devices are electronic devices that are worn by a user (e.g., under, with, or on top of clothing), and they can be useful for applications which can require complex computational support beyond simple hardware coded logics. For example, Google Glass® (Google Glass is a registered trademark of Google Inc. of Mountain View, Calif.) can combine innovative displays with some gestural movements for interactions. Wearable devices can also be customized for a user by installing "mobile apps" on the wearable device. A mobile app (short for the term "application software" and hereinafter also referred to as an "application") is a computer program designed to run on smartphones, tablet computers, and other mobile or wearable devices. Applications are usually available through an application distribution platform, and are typically operated by the owner of the mobile operating system.

As wearable and mobile technology becomes more available, the amount of information stored within these devices can put users at risk to potential security threats. For example, mobile and wearable devices can capture and collect detailed information regarding user health metrics, lifestyle choices, daily routines, current location, and other sensitive data. Applications installed on these devices can also contain sensitive information, such as bank account numbers (e.g., from a mobile banking application) and user emails.

In order to protect information stored within wearable and mobile devices, applications installed on the wearable and mobile devices can be authenticated by a user prior to accessing and using the mobile and wearable devices. Numerous methods of authenticating a device exist. For example, a user may enter an alphanumeric password using an interface, or the device may contain biometric capabilities associated with voice recognition, iris recognition, fingerprint recognition, or other unique biometric data which can be used for authentication purposes.

Aspects of the present disclosure provide a method, device, and computer program product suitable for a first device to unlock at least a second device wherein the two devices are connected via a network. Aspects of the present disclosure locate at least a portion of the first device in the oral cavity of the user. The first device can have sensors embodied therewith such that the sensors can identify stimuli such as pressure, moisture, temperature, or other stimuli. The first device can be separated into a plurality of portions such that each portion is capable of receiving a stimulus. The first device can unlock the second device when a predetermined sequence of stimuli (i.e., the password) is identified by the sensor(s) and received by the first device. In some embodiments, a user's tongue manipulates the device according to the predetermined password. As a result, the second device can be unlocked and accessible to the user.

For the purposes of the present disclosure, references made to a user's mouth should be understood to encompass the mouth generally or any portion thereof. For example, in some embodiments, the term "mouth" can refer to the oral cavity, the vestibule, both, or a portion of either. In various embodiments, aspects of the present disclosure can receive stimuli from the user's lips, tongue, maxillary (upper) teeth, mandibular (lower) teeth, or any other portion of the user's mouth a user is capable of controlling to provide a reproducible series of stimuli in accordance with various embodiments of the present disclosure.

Thus, various embodiments of the present disclosure advantageously increase the security of one or more user devices. Firstly, the present disclosure provides for an authentication device operated within the mouth and, therefore, unseen to the public. As a result, the risk of overseen passcodes can be mitigated. Secondly, the present disclosure provides for a dynamic authentication device. That is the say, according to aspects of the present disclosure, a user can change the password (i.e., the sequence of stimuli) associated with any one or more user devices by creating a new password. For example, the new password can be a different sequence of stimuli (e.g., pressure and location combinations). One result of a dynamic authentication method as opposed to a static authentication method (e.g., biometric data) is the user's ability to change the password as a result of a suspected security breach, or as a preemptive safety precaution. Thus, various aspects of the present disclosure improve security by using a dynamic password that is also hidden from view.

It is understood that the aforementioned advantages represent exemplary advantages, and therefore, not all advantages of the various embodiments are described herein. Furthermore, some embodiments of the present disclosure can exhibit none, some, or all of the advantages listed herein while remaining within the spirit and scope of the present disclosure.

FIG. 1 depicts a block diagram of an authentication device 100 according to some embodiments of the present disclosure. In various embodiments, the authentication device 100 includes a memory 125, storage 130, an interconnect (e.g., BUS) 120, one or more processors (e.g., CPUs) 105, an I/O device interface 110, I/O devices 112, and a network interface 115.

Each CPU 105 retrieves and executes programming instructions stored in the memory 125 or storage 130. In some embodiments, each CPU 105 can execute methods as shown and described in FIGS. 3-4 (described hereinafter), The interconnect 120 is used to move data, such as programming instructions, between the CPU 105, I/O device interface 110, storage 130, network interface 115, and memory 125. The interconnect 120 can be implemented using one or more busses. The CPUs 105 can be a single CPU, multiple CPUs, or a single CPU having multiple processing cores in various embodiments. In some embodiments, the CPU 105 can be a digital signal processor (DSP). Memory 125 is generally included to be representative of a random access memory (e.g., static random access memory (SRAM), dynamic random access memory (DRAM), or Flash). The storage 130 is generally included to be representative of a non-volatile memory, such as a hard disk drive, solid state device (SSD), removable memory cards, optical storage, or flash memory devices. In an alternative embodiment, the storage 130 can be replaced by storage area-network (SAN) devices, the cloud, or other devices connected to the authentication device 100 via the I/O device interface 110 or a communication network 150 via the network interface 115.

The network 150 can be implemented by any number of any suitable communications media (e.g., wide area network (WAN), local area network (LAN), Internet, Intranet, etc.). The authentication device 100 and the sensor(s) 114 can be local to each other and communicate via any appropriate local communication medium (e.g., local area network (LAN), hardwire, wireless link, Intranet, etc.), or they can be physically separated and communicate over a virtual network. In certain embodiments, the network 150 can be implemented within a cloud computing environment or using one or more cloud computing services. Consistent with various embodiments, a cloud computing environment can include a network-based, distributed data processing system that provides one or more cloud computing services.

The network interface 115 and the I/O device interface 110 can utilize, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), or any other wireless communication technology or standard, now known or later developed, to establish a wireless communications link between the authentication device 100 and the one or more user device(s) 160 and/or between the authentication device 100 and the one or more sensor(s) 114.

In some embodiments, the memory 125 stores authentication instructions 128 and the storage 130 stores authentication data 134. However, in various embodiments, the authentication instructions 128 and the authentication data 134 can be stored partially in memory 125 and partially in storage 130, or they can be stored entirely in memory 125 or entirely in storage 130, or they can be stored remotely and can be accessed over a network via the network interface 115.

The authentication instructions 128 (also referred to herein as instructions 128) can store processor executable instructions for various methods such as the methods shown and described with respect to FIGS. 3-4 (described hereinafter). In some embodiments, the authentication data 134 can contain one or more passwords 136. In various embodiments, each respective password 136 is associated with a user device 160, while in alternative embodiments, one password 136 is sufficient to unlock any one, or all, of a plurality of user devices 160 which are communicatively coupled to the authentication device 100 via the network 150. In various embodiments, the user devices 160 can comprise one or more of a wearable device, a mobile device, or other user device.

In some embodiments, the I/O Devices 112 comprise one or more sensors 114. The sensors 114 can be physically affixed to, or communicatively coupled to, the device 100 such that a user wearing the device 100 in the user's mouth can manipulate the individual sensors 114 in predefined patterns. In some embodiments, the user applies pressure to portions of the one or more sensors 114 using the user's tongue in accordance with a predefined password 136. For example, in some embodiments, the sequence of pressures are identified by the sensors 114 and recorded in the memory 125 or storage 130. The sequence is then compared to the password 136. In cases where the sequence matches the password 136, a respective user device 160 will be authenticated (i.e., unlocked) by communicating to the user device 160 the successful authentication via the network interface 115 and the network 150.

Figure 2A:
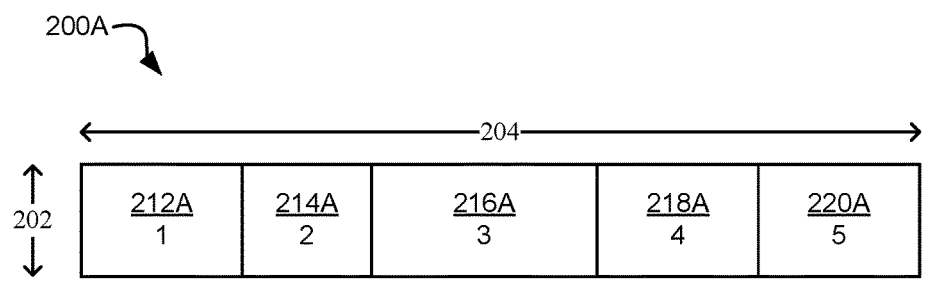
FIG. 2A illustrates a front view of an authentication device according to some embodiments of the present disclosure.

Referring now to FIG. 2A, shown is a front view of an illustrative authentication device 200A in accordance with some embodiments of the present disclosure. The authentication device 200A can comprise a height 202 and a length 204. The authentication device can include a plurality of sensors such as sensors 1-5 (212A-220A). The sensors 1-5 (212A-220A) can sense various stimuli in various embodiments such as, for example, changes in pressure, temperature, moisture, or other variables. In some embodiments, the stimuli can indicate a user's tongue touching a sensor or portion thereof. Thus, in some embodiments, the authentication device 200A identifies a pattern such as 1-5-1-3 which corresponds to a user stimulating sensors 1 (212A), 5 (220A), 1 (212A), and 3 (216A). In some embodiments, the user stimulates the sensors using the user's tongue. In alternative embodiments, the user stimulates the sensors using the other aspects of the user's mouth, such as, for example, teeth. Although the previous example exhibits a combination of location and pressure, alternative embodiments can use combinations of time and pressure. Thus, in such an embodiment, a password such as 1-3-1 could refer to a password comprising a pressure on any one of the sensors for one second followed by a lack of pressure, followed by a pressure on any one of the sensors for three seconds, followed by a lack of pressure, followed by a pressure on any one of the sensors for one second.

Figure 2B:
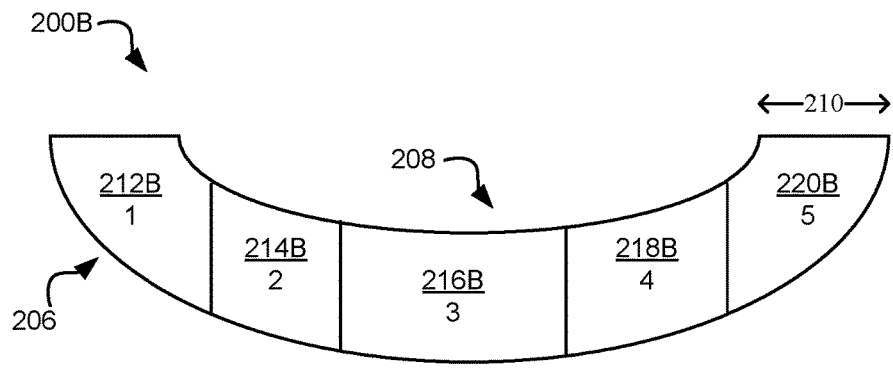
FIG. 2B illustrates a top view of the authentication device according to some embodiments of the present disclosure.

Referring now to FIG. 2B, shown is a top view of the same illustrative authentication device 200B in accordance with some embodiments of the present disclosure. The authentication device 200B can comprise an outer curvature 206, an inner curvature 208, and a thickness 210. The top view of the authentication device illustrates the same sensors 1-5 (212B-220B) as shown in FIG. 2A.

The geometric properties of the authentication device, namely the height 202, length 204, outer curvature 206, inner curvature 208, and thickness 210 are based on, in some embodiments, the dimensions of an average user's mouth. In alternative embodiments, the dimensions of the authentication device can be customized to precisely fit a given user. Although the authentication device shown in FIGS. 2A and 2B comprises a unitary body, a plurality of discontinuous bodies are also possible. For example, each sensor 1-5 (212B-220B) could comprise a discrete device unto itself. Furthermore, the dimensions presented with respect to FIGS. 2A and 2B are not to scale, and, thus, it is to be understood that the thickness 210 can, in some embodiments, comprise a film which is applied to one or more portions of the user's mouth and communicatively coupled to the remaining portions of the authentication device. As a result, in various embodiments, the devices presented in FIG. 2A and FIG. 2B can comprise only the sensors (e.g., sensors 114 of FIG. 1) or both the sensors and the authentication device (e.g., authentication device 100 of FIG. 1). In cases where the devices presented in FIGS. 2A and 2B comprise only the sensors, then a second device (not shown) can be used to analyze the data received by the sensors. In some embodiments, the second device is separate from the one or more user devices. In alternative embodiments, the second device can be embodied with one or more of the user devices as, for example, an application operating on the one or more user devices.

The authentication device shown and described with respect to FIGS. 2A and 2B can comprise numerous materials and methods of manufacture. The authentication device can be made of metallic materials, ceramic materials, natural materials, composite materials, polymeric materials, elastomeric materials, or a combination of the aforementioned materials, among others. The device can be manufactured by numerous methods or combinations of methods such as, but not limited to, forming, casting, molding (compression, transfer, or injection molding), layer-by-layer deposition (e.g., 3D printing), various lithographic techniques, various machining techniques, and other manufacturing techniques. It should be understood that advances in material science and/or manufacturing fall within the spirit and scope of the present disclosure.

Although the device of FIG. 2A and FIG. 2B shows a static device wherein the user interacts with the static device, it is also possible to have a plurality of devices wherein the interaction between the plurality of devices comprises a password and wherein the interaction is moderated by the user. For example, the device could comprise sensors located on both an upper portion of the oral cavity and a lower portion of the oral cavity and the sequence of stimuli may be based on pressure (e.g., teeth touching) or distance (e.g., a change in distance as a result of opening, closing, or otherwise manipulating the mouth) between the plurality of devices. Furthermore, although FIG. 2A and FIG. 2B suggest, in some embodiments, the device is stationary relative to a portion of the mouth (e.g., upper teeth), in some embodiments the device can be moved throughout the mouth. In such an example, a device password can be associated with variables including position (e.g., left or right side of the mouth), orientation (e.g., facing up or facing down wherein the device is asymmetric), time (e.g., duration spent in a position or orientation), and so on.

Thus, the authentication device 200 (authentication device 200 refers to both authentication device 200A and 200B) can comprise numerous geometries. Regardless of geometry, the authentication device 200 can collect various types of data in order to identify a sequence of controllable (by a user) stimuli. A sequence of user-input stimuli which matches a predefined password associated with one or more devices can result in the unlocking of the one or more devices. The sequence of stimuli is advantageously dynamic (i.e., changeable) and discreet (i.e., hidden) which can promote security.

Figure 3:
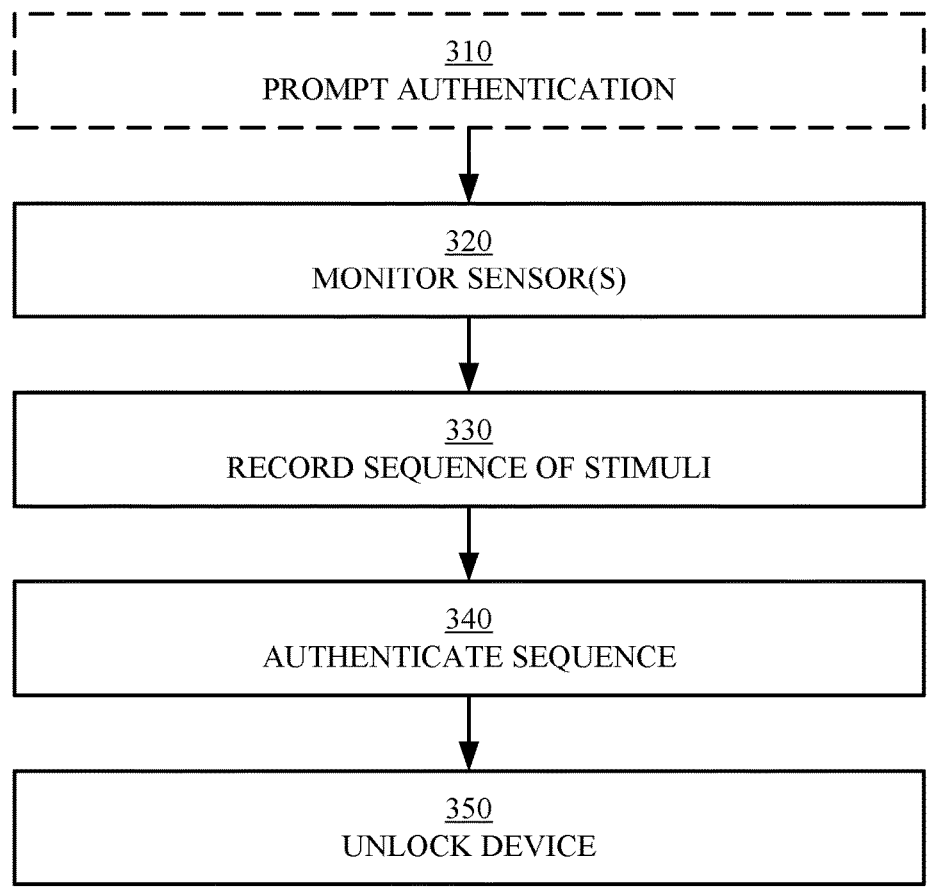
FIG. 3 illustrates a flowchart for authenticating a device in accordance with some embodiments of the present disclosure.

Referring now to FIG. 3, shown is a method for unlocking a device in accordance with some embodiments of the present disclosure. The method 300 can be executed by one or more processors (e.g., CPUs 105 of FIG. 1) based on a set of instructions (e.g., authentication instructions 128 of FIG. 1).

The method 300 can begin with operation 310 (shown as optional via the dashed box) in which the authentication device is prompted to unlock a user device. Operation 310 can be initiated by a user action such as, but not limited to, pressing a button, tapping a screen, providing a voice command, or another suitable act indicating the user wishes to access the device or run an application. In some embodiments, the authentication prompt is a result of a user interaction with the authentication device rather than the user device. For example, the authentication prompt can be initiated by a user applying a five second pressure on a designated portion of the sensor. This unique pressure, location, and duration combination can indicate the user wishes to unlock a device, and, following the prompt, the user can enter the corresponding password.

The authentication prompt of operation 310 can cause the authentication device to monitor one or more sensors (e.g., sensors 114 of FIGS. 1 and 212A-220A of FIG. 2A) associated with the authentication device in operation 320. Operation 320 can comprise monitoring changes in pressure, temperature, moisture, or other variables. In various embodiments, operation 320 further comprises monitoring the location, duration, and/or time between changes in the aforementioned variables. In embodiments where operation 310 does not occur, the authentication device can monitor the one or more sensors continuously, substantially continuously, or at predetermined intervals of time.

In operation 330, a sequence of stimuli identified by the sensors can be recorded in a memory or storage of the authentication device (e.g., memory 125 or storage 130 of FIG. 1). In various embodiments, the sequence of stimuli is stored temporarily. For example, operation 330 may store each received stimulus for ten seconds to ensure the correct password is entered within a certain amount of time and to increase the computational efficiency of operation 330.

In operation 340, the recorded sequence of stimuli can be compared to a password (e.g., password 136 of FIG. 1) and a positive match can result in successful authentication. Operation 350 comprises unlocking the device as a result of the successful authentication. In some embodiments, operation 350 comprises sending a message via a network (e.g., network 150 of FIG. 1) to the user device to unlock it.

Figure 4:
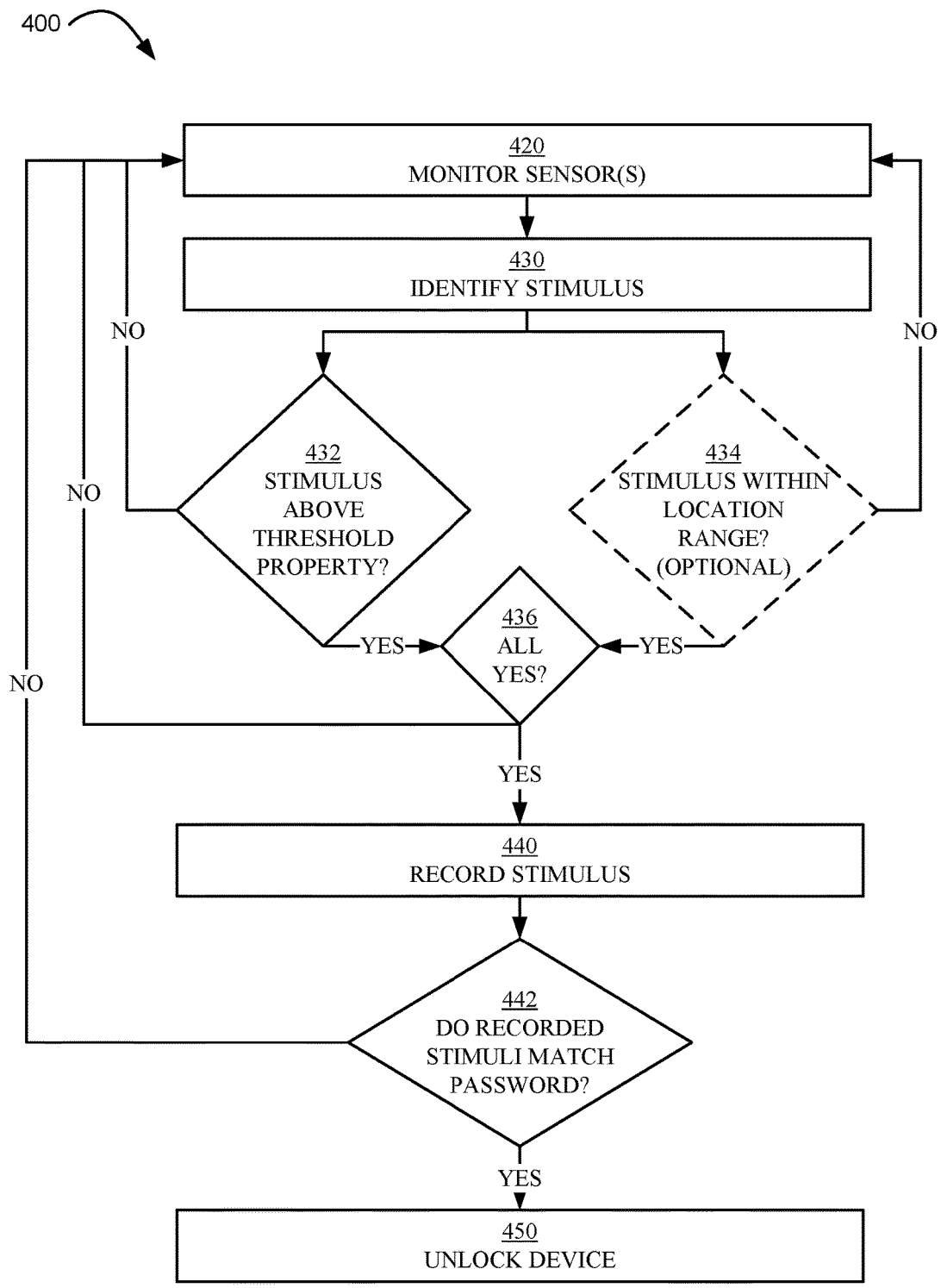
FIG. 4 illustrates a flowchart for orally authenticating a device in accordance with some embodiments of the present disclosure.

Referring now to FIG. 4, shown is a method for authenticating a device in accordance with some embodiments of the present disclosure. The method 400 can be executed by one or more processors (e.g., CPUs 105 of FIG. 1) based on a set of instructions (e.g., authentication instructions 128 of FIG. 1). The method 400 can begin by monitoring the sensors associated with the authentication device (e.g., sensors 114 of FIG. 1) in operation 420. In operation 430, the authentication device identifies a stimulus. In various embodiments the stimulus can comprise a change in pressure, temperature, moisture, chemistry, or other stimuli capable of being measured by the sensor and controlled by a user.

In operation 432, the authentication device determines if the stimulus is above a threshold. The threshold can be, for example, a pressure, a time, a moisture level, a chemical state, a temperature, a different property, or a combination of the aforementioned properties. If the stimulus is not above a defined threshold, the method 400 returns to operation 420 and the authentication device continues to monitor the sensors. In operation 434 (optional per the dashed lines), the stimulus can be compared to an acceptable location range to determine if the stimulus is sufficiently located to be associated with a discrete region of a single sensor or with a discrete sensor of a plurality of sensors. Operation 434 can, for example, exclude stimuli which overlap two or more sensors. If the stimulus is not found to be within a permissible location range, the method 400 returns to operation 420 and continues to monitor the sensors.

Should the stimulus be within a location range, the method 400 can continue to operation 436. Operation 436 verifies both operation 432 and operation 434 return "yes" responses in cases where operation 434 occurs in addition to operation 432. If so, then the method 400 continues to operation 440 and records the stimulus. If not, the method 400 returns to monitoring the sensors in operation 420.

As shown in FIG. 4, operations 432 and 434 can occur in parallel. However, the operations 432 and 434 can also occur sequentially. In embodiments where operation 434 does not occur, then only operation 432 need produce a "yes" response to proceed to operation 440. In some embodiments, further criteria can be evaluated in addition to operation 432 and operation 434. For example, an additional operation may verify sequential stimuli occur within a given threshold of time. In such a case, operation 436 may require three affirmative responses to proceed to operation 440.

In operation 440, the stimulus is recorded. The stimulus can be recorded in, for example, a memory 125 or storage 130 of FIG. 1. In some embodiments, the recording comprises a location (e.g., which sensor), and the recording can also comprise, in various embodiments, other properties such as time, pressure, and so on. These other properties can permit complex passwords. Complex passwords can include, for example, a correct duration of time on, or time between, each stimulus in addition to a correct sequence of stimuli (e.g., sensor 1 for 1 second, sensor 5 for 5 seconds, sensor 3 for 1 second).

In operation 442, the recorded stimuli are compared to a password (e.g., password 136 of FIG. 1). In some embodiments, operation 442 compares the last number of stimuli recorded to the number of stimuli associated with the password. For example, if the password is associated with three touches, then operation 442 can compare the previous three recorded touches to the password and determine if the recorded stimuli match the password following each recorded stimulus. If the recorded stimuli do not match the password, the method returns to monitoring the sensors in operation 420. If the recorded stimuli do match the password, the method proceeds to operation 450 in which the device initiating the authentication prompt is unlocked. In some embodiments, the authentication device can send a message to the user device which unlocks the user device.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
monitoring a plurality of sensors located in an oral cavity of a user and configured to measure a property controllable by the user;
identifying a sequence of stimuli, wherein the sequence of stimuli comprises, for each respective stimulus, a respective pressure on a respective sensor, wherein the respective pressure is above a pressure threshold and is applied by a tongue of the user contacting the respective sensor;
matching the sequence of stimuli to a password associated with a user device, wherein the password comprises:
a first pressure above the pressure threshold on a first sensor of the plurality of sensors for a first time within a first time range; and
a second pressure above the pressure threshold on a second sensor of the plurality of sensors for a second time within a second time range, wherein the second pressure is sequential to the first pressure, and wherein a time between the first pressure and the second pressure is below a consecutive time threshold; and
unlocking a portion of the user device in response to matching the sequence of stimuli to the password.

2. The method of claim 1, further comprising:
recording the sequence of stimuli, the recording comprising a sequence of sensors and a sequence of times, the sequence of sensors corresponding to sensors receiving a pressure above the pressure threshold, and the sequence of times corresponding to respective times the respective sensors in the sequence received pressure above the pressure threshold.

3. The method of claim 1, wherein each stimulus of the sequence of stimuli is within a first location range, wherein the first location range comprises a permissible physical range of a stimulus relative to a respective sensor of the plurality of sensors.

4. The method of claim 1, further comprising a plurality of user devices wherein each respective user device is unlocked in response to determining, based on comparing the sequence of stimuli to the password, that the sequence of stimuli matches the password.

5. The method of claim 1 further comprising:
receiving a prompt for authentication based on a user input, wherein the prompt for authentication comprises a pressure above the pressure threshold for at least a first time on a sensor of the plurality of sensors; and
wherein monitoring the plurality of sensors comprises monitoring the plurality of sensors in response to receiving the prompt for authentication.

6. The method of claim 1, wherein each pair of stimuli is separated by a time below a time threshold.

7. A system comprising:
a plurality of sensors each configured to sense a user-controlled stimulus and located in an oral cavity of a user;
a memory configured to store a first sequence of stimuli corresponding to a password, wherein the password comprises:
a first pressure above the pressure threshold on a first sensor of the plurality of sensors for a first time within a first time range; and
a second pressure above the pressure threshold on a second sensor of the plurality of sensors for a second time within a second time range, wherein the second pressure is sequential to the first pressure, and wherein a time between the first pressure and the second pressure is below a consecutive time threshold;
a processing unit communicatively coupled to the plurality of sensors and the memory, the processing unit configured to:
monitor the plurality of sensors to detect a second sequence of stimuli and to match the second sequence of stimuli to the first sequence of stimuli, wherein the second sequence of stimuli comprises, for each respective stimulus, a respective pressure on a respective sensor, wherein the respective pressure is above the pressure threshold and is applied by a tongue of the user contacting the respective sensor; and
unlock a portion of a user device in response to matching the second sequence of stimuli to the first sequence of stimuli.

8. The system of claim 7, wherein the plurality of sensors are further configured to identify a location associated with each respective stimulus, and wherein the first sequence of stimuli comprises a sequence of locations.

9. The system of claim 7, wherein the plurality of sensors are further configured to sense stimuli being within a threshold range, wherein the threshold range comprises a distance between a respective stimulus and a respective sensor of the plurality of sensors.

10. The system of claim 7, wherein each user-controlled stimulus further comprises a temperature above a temperature threshold.

11. The system of claim 7, wherein the processing unit is located in the user device.

12. A computer program product for authenticating a user device, the computer program product comprising a computer readable storage medium having program instructions embodied therewith, wherein the computer readable storage medium is not a transitory signal per se, the program instructions executable by a processor to cause the processor to perform a method comprising:
monitoring respective data received from a plurality of sensors each located in a mouth of a user and configured to sense stimuli controllable by the user;
determining a sequence of stimuli, wherein the sequence of stimuli comprises, for each respective stimulus, a respective pressure on a respective sensor, wherein the respective pressure is above a pressure threshold and is applied by a tongue of the user contacting the respective sensor;
matching the sequence of stimuli to a password associated with a user device, wherein the password comprises:
a first pressure above the pressure threshold on a first sensor of the plurality of sensors for a first time within a first time range; and
a second pressure above the pressure threshold on a second sensor of the plurality of sensors for a second time within a second time range, wherein the second pressure is sequential to the first pressure, and wherein a time between the first pressure and the second pressure is below a consecutive time threshold;
unlocking a portion of the user device in response to matching the sequence of stimuli to the password.

13. The computer program product of claim 12, wherein the sequence of stimuli comprises a sequence of pressures, wherein each respective pressure is associated with a location.

14. The computer program product of claim 12, wherein the password comprises a sequence of locations based on the sequence of sensors.

15. The computer program product of claim 12, the processor being configured to perform a method further comprising:
   unlocking at least a portion of a second user device in response to matching the sequence of stimuli to the password.

16. The computer program product of claim 12, wherein the processor being configured to perform a method further comprising:
   receiving a prompt for authentication based on user input; and
   wherein monitoring the plurality of sensors comprises monitoring the plurality of sensors in response to receiving the prompt for authentication.

17. The computer program product of claim 12, wherein the processor being further configured to perform a method comprising:
   determining, for each respective stimulus, that the respective stimulus is above a property threshold.

18. The computer program product of claim 17, wherein determining that the stimulus is above a property threshold further comprises determining that the stimulus is within a first location range, wherein the first location range comprises an acceptable distance relative to a respective sensor of the plurality of sensors.

19. The computer program product according to claim 12, wherein the password further comprises:
   a third pressure above the pressure threshold on a third sensor of the plurality of sensors for a third time within a third time range.

20. The computer program product according to claim 19, wherein the third pressure is sequential to the second pressure, and wherein a time between the second pressure and the third pressure is below the consecutive time threshold.

* * * * *